United States Patent Office 3,732,279
Patented May 8, 1973

3,732,279
PREPARATION OF m-(β-CYANOETHOXY) BENZOIC ACID AND ESTERS THEREOF
Norio Kotera, Amagasaki, and Yoshitsugu Suzuki, Takarazuka, Japan, assignors to Sumitomo Chemical Company, Limited, Osaka, Japan
No Drawing. Filed Mar. 1, 1971, Ser. No. 119,924
Claims priority, application Japan, Mar. 10, 1970,
45/20,734
Int. Cl. C07c *121/02*
U.S. Cl. 260—465 D                7 Claims

ABSTRACT OF THE DISCLOSURE m-(β-Cyanoethoxy)benzoic acid and the lower alkylesters thereof are obtained in a high yield by cyanoethylating m-hydroxybenzoic acid and the lower alkylesters thereof with acrylonitrile in the presence of a tertiary amine. Said products are highly useful as starting materials or intermediates for polyamides and polyesters.

---

The present invention relates to a process for the preparation of m-(β-cyanoethoxy)benzoic acid and the alkyl esters thereof, which are novel compounds important as starting materials or intermediates for various organic compounds, in particular condensed high molecular compounds, by cyanoethylating m-hydroxy benzoic acid and the alkyl esters thereof.

It has heretofore been known that generally a phenolic hydroxyl group is converted to a cyanoethoxy group by reacting with an acrylonitrile in the presence of a basic catalyst such as an alkali metal, an alcolate thereof, or a hydroxide thereof, a quaternary ammonium salt and the like. However, there has been no description in any literature concerning the preparation of cyanoethyl compounds of m-hydroxybenzoic acid (abbreviated to MOB hereinafter) and alkyl esters thereof (abbreviated to MOBA hereinafter) wherein said alkyl group is a lower alkyl group having 1 to 4 carbon atoms.

As catalysts for cyanoethylating a phenolic hydroxyl group using acrylonitrile, there has generally been used any of the compounds selected from those mentioned above, and there has not been used yet a tertiary amine as a catalyst therefor.

The present inventors have effected the reaction of MOB or MOBA with acrylonitrile in the presence of an alkali metal, an alcoholate and a hydroxide thereof, and a quarternary ammonium salt usually used as catalysts for cyanoethylation. However, as is clear from the comparative examples, it was found very difficult to obtain a desired cyanoethylated compound. Thereafter, as is seen in examples, the present inventors have succeeded in obtaining the desired cyanoethylated compound in a high yield by employing a tertiary alkyl amine as a catalyst for the cyanoethylation of MOB and MOBA.

The present invention will be explained in more detail hereunder. A mixture of MOB or MOBA, acrylonitrile and a tertiary amine, in a suitable solvent if necessary, is treated to convert a hydroxyl group into a β-cyanoethoxy group. In the above reaction, the amount of acrylonitrile used is from 1 to 20 moles, preferably from 2 to 10 moles, per mole of MOB or MOBA used, and the amount of a tertiary amine used as a catalyst is from 0.1 to 2 moles, preferably from 0.3 to 1 mole, per mole of MOB or MOBA used. The tertiary amines used as catalysts include lower aliphatic amines, i.e. a trialkylamine such as triethylamine, tripropylamine, and tributylamine and alicyclic compounds containing at least one tertiary nitrogen atom, such as N-methylmorpholine, N-ethylmorpholine, N-methylpiperidine, N-ethylpiperidine, N,N'-dimethylpiperazine, and N,N'-diethylpiperazine.

The tertiary amine and an unreacted excess acrylonitrile used can be reused by recovering them after the reaction is completed.

A solvent may be used in the present invention in order to proceed the reaction in a homogeneous system and to inhibit the polymerization during the reaction. The solvents used include any of the inert solvents having no hydroxyl group, amino group and the like.

Examples of the solvent are ethers such as dioxane and tetrahydrofuran, aliphatic hydrocarbons such as hexane, heptane and octane, and aromatic hydrocarbons such as benzene, toluene, xylene and methylnaphthalene.

The reaction is conducted under reflux or in an autoclave at a temperature above 80° C. for 30 to 100 hours, usually 50 to 80 hours. Thereafter, the excess amount of acrylonitrile is removed by distillation and the residue is either distilled under a reduced pressure or dissolved in a suitable organic solvent followed by washing with diluted hydrochloric acid, a diluted alkali solution and water successively and the solvent is distilled off to obtain m-(β-cyanoethoxy)benzoic acid or the alkyl ester thereof in a high purity and a high yield.

The nitrile compound obtained in accordance with the present invention is highly useful as a starting material or an intermediate for polyamides and polyesters.

The present invention is illustrated by reference to the examples hereinafter together with the comparative examples using previous catalysts.

EXAMPLE 1

To a solution of 152 g. of methyl m-hydroxybenzoate in 212 g. of acrylonitrile, 65 g. of triethylamine was added and the mixture was heated under reflux for 72 hours. After the reaction was completed, an unreacted acrylonitrile and triethylamine were distilled off. The residue was dissolved in benzene and washed with 3-N hydrochloric acid, 10% aqueous solution of caustic soda and water successively and thereafter benzene was distilled off to obtain methyl m-(β-cyanoethoxy)benzoate having a melting point of from 78.5 to 79.5° C. The purity and the yield thereof were 98.7% and 65%, respectively.

EXAMPLE 2

To a solution of 179 g. of ethyl m-hydroxybenzoate in 212 g. of acrylonitrile, 30 g. of triethylamine was added and the mixture was heated under reflux for 72 hours. After the reaction was completed, an unreacted acrylonitrile and triethylamine were distilled off under an atmospheric pressure and then the residue was distilled under a reduced pressure to obtain ethyl m-(β-cyanoethoxy)benzoate having a boiling point of 165 to 170° C./4 mm. Hg. The purity and the yield thereof were 98.5% and 72%, respectively.

EXAMPLE 3

To a solution of 179 g. of ethyl m-hydroxybenzoate in 500 ml. of benzene, 159 g. of acrylonitrile and 50 g. of triethylamine were added thereto and the mixture was heated under reflux for 65 hours. After the reaction was completed, triethylamine was removed with diluted hydrochloric acid and an unreacted ethyl m-hydroxybenzoate was removed with a diluted aqueous solution of caustic soda. Thereafter, benzene and an excess acrylonitrile were disilled off to give a compound having the same purity as that of a cyanoethoxylated compound obtained in Example 2. The product was further distilled under a reduced pressure to obtain ethyl m-(β-cyanoethoxy)benzoate having a boiling point of 168 to 171° C./4 mm. Hg and having a purity higher than above one. The purity and the yield thereof were 99.9% and 65%, respectively.

EXAMPLE 4

To a solution of 152 g. of methyl m-hydroxybenzoate in 265 g. of acrylonitrile, 50 g. of N-methylpiperidine was added and the mixture was heated under reflux for 70 hours. The reaction mixture was treated in the same manner as in Example 1 to obtain 105 g. of methyl m-(β-cyanoethoxy)benzoate, yield 51%, M.P. 78 to 80° C.

COMPARATIVE EXAMPLE 1

To a solution of 179 g. of ethyl m-hydroxybenzoate in 212 g. of acrylonitrile, 5.6 g. of potassium hydroxide as a catalyst was added and the mixture was heated under reflux for 72 hours and treated in the same manner as in Example 2, then ethyl m-(β-cyanoethoxy)benzoate was scarcely obtained.

COMPARATIVE EXAMPLE 2

To a solution of 152 g. of methyl m-hydroxybenzoate in 256 g. of acrylonitrile, 5.4 g. of sodium methylate was added and the mixture was heated under reflux for 48 hours and treated in the same manner as in Example 1, then methyl m-(β-cyanoethoxy)benzoate was scarcely obtained.

COMPARATIVE EXAMPLE 3

To a solution of 179 g. of ethyl m-hydroxybenzoate in 212 g. of acrylonitrile and Triton B (Trademark of benzyl trimethyl ammonium hydroxide produced by Rohm & Haas Co.) was added thereto in an amount of 10 mole percent based upon the reactants and the mixture was heated under reflux for 24 hours, then there was scarcely obtained ethyl m-(β-cyanoethoxy)benzoate as a product. However, when the reaction was continued under reflux for 72 hours, there was obtained in a yield of 5%.

What is claimed is:

1. A process for the preparation of m-(β-cyanoethoxy) benzoic acid and lower alkyl esters thereof, which comprises reacting m-hydroxybenzoic acid or lower alkyl esters thereof with acrylonitrile in the presence of a tertiary amine as a catalyst, wherein the amount of acrylonitrile used is from 1 to 20 moles per mole of m-hydroxybenzoic acid or a lower alkylester thereof and wherein the reaction is carried out at a temperature above 80° C.

2. A process according to claim 1, wherein the tertiary amine is a lower alkylamine and an alicyclic compound containing at least one tertiary nitrogen atom.

3. A process according to claim 2, wherein the lower alkylamine is triethylamine, tripropylamine or tributylamine.

4. A process according to claim 2, wherein the alicyclic compound is an N-alkylmorpholine, an N-alkylpiperidine or N,N'-dialkylpiperazine.

5. A process according to claim 1, wherein the amount of tertiary amine used is from 0.1 to 2 moles per mole of m-hydroxybenzoic acid or a lower alkylester thereof.

6. A process according to claim 1, wherein the reaction is conducted in the presence of an inert solvent.

7. A process according to claim 1, wherein the reaction is conducted under reflux.

References Cited

Nagai et al.: Chemical Abstracts, vol. 72, p. 12389h (January 1970).

Soc. pour l'ind. chim. à Bâle: Chemical Abstracts, vol. 32, p. 1279 (1938).

LEWIS GOTTS, Primary Examiner

D. H. TORRENCE, Assistant Examiner